United States Patent
Iba

(10) Patent No.: US 8,099,374 B2
(45) Date of Patent: Jan. 17, 2012

(54) BEHAVIOR ESTIMATING SYSTEM

(75) Inventor: Soshi Iba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 427 days.

(21) Appl. No.: 12/487,225

(22) Filed: Jun. 18, 2009

(65) Prior Publication Data

US 2009/0326679 A1  Dec. 31, 2009

(30) Foreign Application Priority Data

Jun. 27, 2008 (JP) ................. 2008-169534

(51) Int. Cl.
*G06N 5/00* (2006.01)
(52) U.S. Cl. .......................... 706/12; 706/45
(58) Field of Classification Search .......... 706/12, 706/45
See application file for complete search history.

(56) References Cited

PUBLICATIONS

Full, et al., Quantifying Dynamic Stability and Maneuverability in Legged Locomotion, Integrative and Comparative Biology, vol. 42, Issue 1, pp. 149-157.*
Dennis, et al., Estimating Chaos and Complex Dynamics in an Insect Population, Ecological Monographs, 71(2), 2001, pp. 277-303.*
"Motion Emergency of Humanoid Robots by Attractor Design of a Nonlinear Dynamics", Masafumi Okada et al., Journal of the Society of Instrument and Control Engineers, vol. 41, No. 6, pp. 533-540 (2005).

* cited by examiner

*Primary Examiner* — Wilbert L Starks
(74) *Attorney, Agent, or Firm* — Rankin, Hill & Clark LLP

(57) ABSTRACT

A behavior estimating system is provided. According to the system, an estimated trajectory which provides the basis on which the behavior of an agent is controlled is generated according to a second model which represents a motion of an instructor in which the position and the displacing velocity of the position of a state variable and the time differential values thereof continuously change, in addition to the position of a characteristic point of a reference trajectory which represents a motion of the instructor and a plurality of first models which represent a plurality of shape characteristics of reference trajectories. A behavior manner corresponding to a first model whose fluctuation, which is allowed under a condition that an estimated trajectory passes a characteristic state variable or a range in the vicinity thereof, is the smallest and whose stability is the highest is estimated as the behavior manner of the instructor.

5 Claims, 12 Drawing Sheets

BEHAVIOR ESTIMATING SYSTEM

BACKGROUND OF THE INVENTION

1. Field of the Invention

The present invention relates to a system for estimating a behavior manner of an instructor.

2. Description of the Related Art

A polynomial, Bezier or attractor or the like has been used as a technique to generate a trajectory of a state variable of an agent suited to an actual situation on the basis of a reference state variable trajectory. For example, it has been reported that a stable autonomous motion of a humanoid robot acting as an agent is achieved by designing an attractor in the state space of a dynamical system and entraining a trajectory of the robot by the attractor (refer to "Motion Emergence of Humanoid Robots by an Attractor Design of Nonlinear Dynamics" by Masashi Okada, Kenta Osato, and Yoshihiko Nakamura in Journal of the Society of Instrument and Control Engineers, vol. 41, No. 6, pp 533-540 (2005)).

However, while the behavior of an agent is controlled according to the behavior of an instructor, erroneous estimation of the behavior manner of the instructor would make it difficult for the agent to perform a specified task.

SUMMARY OF THE INVENTION

An object of the present invention is to provide a system capable of improving the accuracy of estimating the behavior manner of an instructor.

A behavior estimating system according to a first aspect of the invention is a system for estimating a behavior manner of an instructor, including: a state recognizing element which recognizes the position of a state variable, which is displaced as the instructor moves, at one or a plurality of reference time points as the position of one or a plurality of reference points; and a trajectory generating element which generates, on the basis of the position or positions of the reference point or points recognized by the state recognizing element, a plurality of estimated trajectories representing the estimated positions of a state variable in a time-series manner according to a plurality of first models which correspond to a plurality of behavior manners of the instructor and represent the shape characteristics of individual reference trajectories indicative of the time-series changing manners of the position of the state variable and a second model which represents a motion of the instructor in which the position of the state variable and one or a plurality of n-th order time differential values (n=1, 2, . . . ) thereof continuously change, under a condition that the estimated trajectories pass the reference point or points or a range or ranges in the vicinity thereof, wherein fluctuations of the first models are allowed, the stabilities of the first models in the process of generation of the plurality of estimated trajectories by the trajectory generating element are assessed on the basis of the cumulative amounts of the fluctuations, and a behavior manner corresponding to one of the first models which exhibits a highest stability is estimated as a behavior manner of the instructor.

According to the behavior estimating system in accordance with the first aspect of the invention, estimated trajectories which represent the time-series changing manners of the estimated positions of a state variable are generated according to the first models and the second model on the basis of the positions of reference points. The term the position of "a reference point" means the position of a state variable, which is displaced as an instructor moves, at a reference time point. The term "state variable" presents a concept that includes scalars and vectors and also a concept that includes probability distribution variables. The term "position of a state variable" means a position in a space defined by the state variable.

The first models correspond to the individual different behavior manners of the instructor and represent the shape characteristics of the individual reference trajectories indicating the time-series changing manners of the position of a state variable.

The second model represents a motion of the instructor in which the position of a state variable and one or a plurality of n-th order time differential values (n=1, 2, . . . ) continuously change.

Hence, each estimated trajectory represents a time-series changing manner of the position of a state variable in the case where it is assumed that the instructor has taken a certain behavior manner by a smooth motion in which the position of a state variable and one or a plurality of n-th order time differential values thereof are continuous. Fluctuations of the first models are allowed under a condition that estimated trajectories are generated such that the estimated trajectories pass reference points or ranges in the vicinity thereof. A first model having a small cumulative fluctuation amount, i.e., a high stability, is very likely to be a model which permits least difficult or smoothest reproduction of the time-series changing manner of the position of a state variable when the instructor behaves. Therefore, the behavior manner corresponding to the first model with a high stability is very likely to correspond to an actual behavior manner of the instructor. Thus, the estimation accuracy is improved by estimating the behavior manner corresponding to the first model having the highest stability as the behavior manner of the instructor.

In a behavior estimating system in accordance with a second aspect of the invention, the trajectory generating element generates an estimated trajectory in a forward direction as the estimated trajectory by estimating the position of the state variable at each time point in the forward direction in a time-series manner and generates an estimated trajectory in a reverse direction as the estimated trajectory by estimating the position of the state variable at each time point in the reverse direction in a time-series manner in the behavior estimating system according to the first aspect of the invention.

According to the behavior estimating system in accordance with the second aspect of the invention, the estimated trajectories in the forward direction and the reverse direction, which represent the time-series changing manners of the estimated positions of a state variable, are generated for the forward direction and the reverse direction, respectively, in a time-series manner. The two estimated trajectories represent the changing manners of the position of the state variable in the forward direction and the reverse direction, respectively, in a time-series manner in the case where it is assumed that the instructor has taken a certain behavior manner by a smooth motion in which the position of the state variable and one or a plurality of n-th order time differential values thereof are continuous. As described above, a first model having a small cumulative fluctuation amount, i.e., a high stability, is very likely to be a model which permits least difficult or smoothest reproduction of the time-series changing manner of the position of a state variable when the instructor behaves. Therefore, the estimation accuracy is improved by estimating the behavior manner corresponding to the first model having the highest stability as the behavior manner of the instructor when generating the estimated trajectories in the forward direction and the reverse direction, respectively.

In the behavior estimating system in accordance with a third aspect of the invention, the trajectory generating element generates a plurality of the estimated trajectories on the basis of a plurality of the first models respectively corresponding to a plurality of behavior manners respectively of the instructor which change from a first behavior manner to a second behavior manner at different timings in the behavior estimating system according to the first aspect of the invention.

According to the behavior estimating system in accordance with the third aspect of the invention, a plurality of estimated trajectories is generated on the basis of a plurality of first models corresponding to various behavior manners which change at different timings whereas the behavior manners thereof all change along the way. Then, the behavior manner corresponding to the first model with a highest stability when the plurality of estimated trajectories is generated is estimated as the behavior manner of the instructor, as described above. This arrangement leads to improved accuracy of estimating the behavior manner of the instructor distinguished by different timings of shifting from a first behavior manner to a second behavior manner.

In a behavior estimating system in accordance with a fourth aspect of the invention, the trajectory generating element generates a plurality of the estimated trajectories on the basis of a plurality of the first models respectively corresponding to a plurality of behavior manners respectively of the instructor which change, at different time points, from the first behavior manner for the instructor to apply a force to an object to the second behavior manner after the instructor applies the force to the object in the behavior estimating system according to the third aspect of the invention.

The behavior estimating system in accordance with the fourth aspect improves the accuracy of estimating behavior manners which are distinguished by different timings at which the first behavior manner is switched to the second behavior manner, i.e., by different timings at which the instructor applies a force to an object, on the basis of the stabilities of the first models when a plurality of estimated trajectories is generated as described above.

In a behavior estimating system in accordance with a fifth aspect of the invention, the trajectory generating element defines the shape characteristics of the reference trajectories by attractors and the positions of the attracting points thereof and generates the estimated trajectories by using the first models which fluctuate due to the displacements of the attracting points, and the behavior estimating system assesses the first models having less cumulative displacement amounts of the attracting points of the attractors as the first models having higher stabilities in the behavior estimating system according to the first aspect of the invention.

According to the behavior estimating system in accordance with the fifth aspect of the invention, a first model with a higher stability with a smaller cumulative displacement amount of the attracting point of an attractor is very likely to be a model which permits least difficult or smooth reproduction of the time-series changing manner of the position of a state variable when an instructor moves. Thus, the estimation accuracy is improved by estimating the behavior manner corresponding to an estimated trajectory generated according to the first model having the highest stability as the behavior manner of the instructor.

DESCRIPTION OF THE PREFERRED EMBODIMENTS

Figure 1:
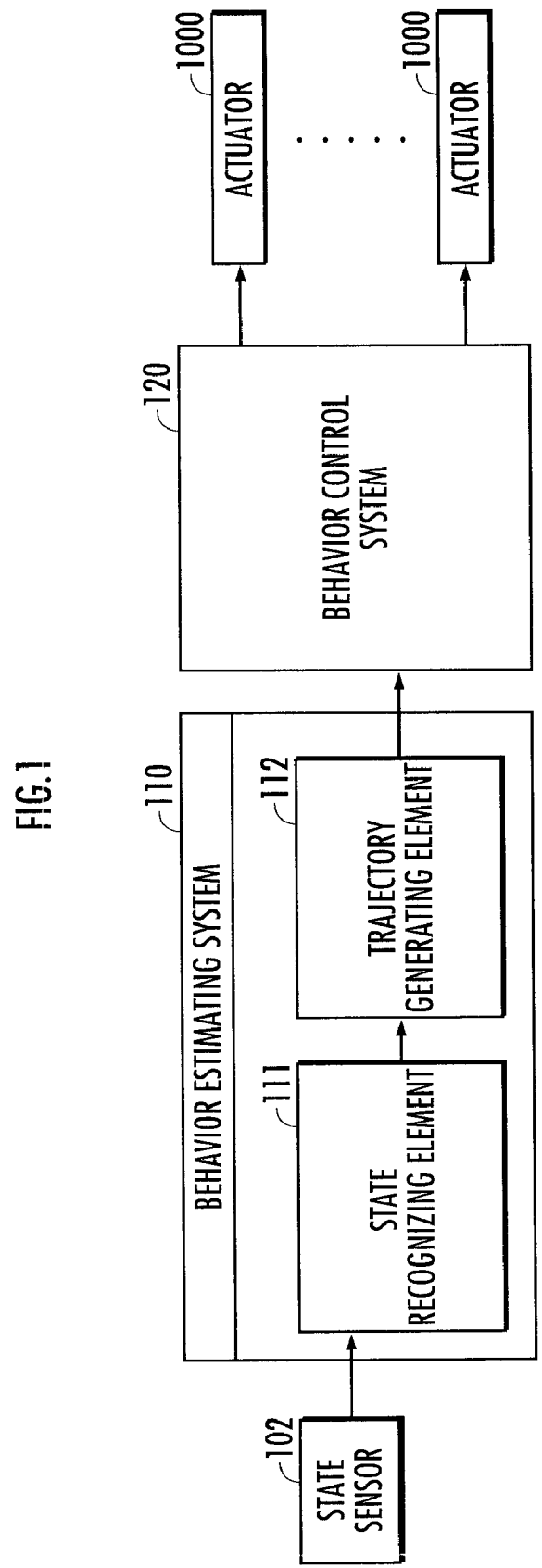
FIG. 1 is a block diagram of a behavior estimating system in accordance with the present invention.
Figure 2:
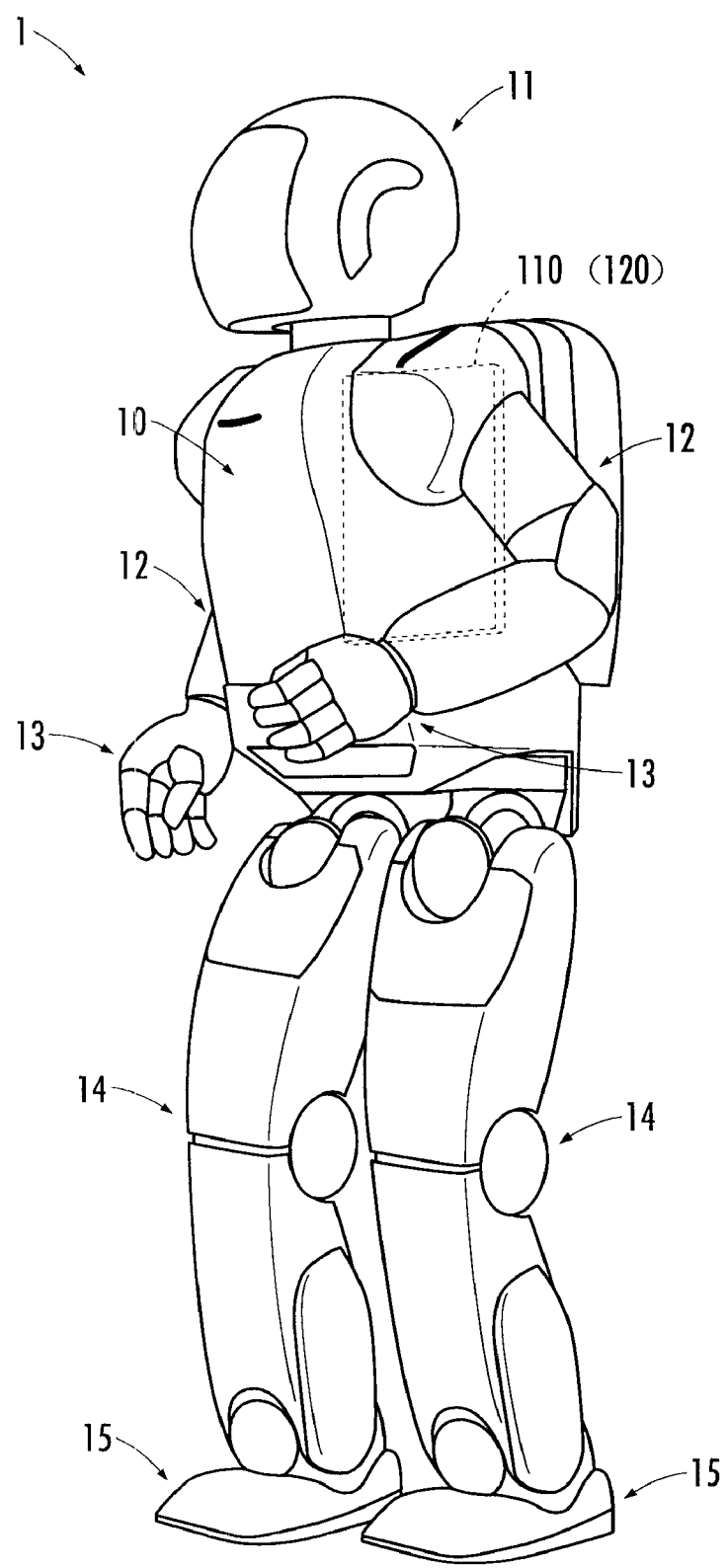
FIG. 2 is a graphical illustration of the construction of a robot as an agent.

The following will describe embodiments of a behavior estimating system in accordance with the present invention with reference to the accompanying drawings. First, the construction of the behavior estimating system will be described. A behavior estimating system 110 illustrated in FIG. 1 estimates the behavior manners of an instructor, such as a human being. A behavior control system 120 illustrated in FIG. 1 controls the behavior of a robot 1 by controlling the operations of actuators 1000 mounted in the robot 1 acting as an agent illustrated in FIG. 2 on the basis of estimation results provided by the behavior estimating system 110.

The robot 1 is a legged mobile robot and provided with a body 10, a head 11 mounted on the top of the body 10, right and left arms 12 extended from the right and left sides of an upper portion of the body 10, hands 13 provided at the distal ends of the arms 12, right and left legs 14 extended downward from the bottom of the body 10, and feet 15 attached to the distal ends of the legs 14, as with a human being.

As disclosed in Published Japanese Translation of PCT Application 03-090978 or Published Japanese Translation of PCT Application 03-090979, the robot 1 is capable of bending and stretching the arms 12 and the legs 14 at a plurality of joint mechanisms corresponding to a plurality of joints, such as shoulder joints, elbow joints, carpal joints, hip joints, knee joints, and foot joints, of a human being by using forces transmitted from the actuators 1000. Each of the arms 12 has a first arm link connected to the body 10 through the intermediary of a shoulder joint mechanism and a second arm link having one end thereof connected to an end of the first arm link through the intermediary of an elbow joint mechanism and the other end thereof connected to the root of the hand 13 through the intermediary of the carpal joint. Each of the legs 14 has a first leg link connected to the body 10 through the intermediary of a hip joint mechanism and a second leg link having one end connected to an end of the first leg link through the intermediary of a knee joint mechanism while the other end connected to the foot 15 through the intermediary of a foot joint. The robot 1 is capable of autonomously moving by repeatedly leaving and landing the right and left legs 14 from and onto a floor.

The behavior estimating system 110 and the behavior control system 120 are constructed of electronic control units, which are constituted primarily of CPUs, ROMs, RAMs, and I/O circuits, or computers mounted in the robot 1. The behavior estimating system 110 may be constructed of an external computer of the robot 1, while the behavior control system 120 may be constructed of a computer which is mounted in the robot 1 and which permits wireless or wired communication with the external computer.

The behavior estimating system 110 has a state recognizing element 111 and a trajectory generating element 112.

The state recognizing element 111 recognizes the values of a variety of state variables on the basis of output signals from a state sensor 102. The state sensor 102 includes a motion capture system (not shown) which is separate and independent from the robot 1. The state sensor 102 includes, for example, a stereo image sensor mounted on the head 11 to measure the positional trajectory of an object, such as a ball, related to the execution of a task, and an active sensor using infrared light mounted on the body 10. The state recognizing element 111 recognizes the position of a state variable, which is displaced as an instructor moves, at a reference time point as the position of a reference point on the basis of an output signal of the state sensor 102.

The trajectory generating element 112 generates a plurality of estimated trajectories representing the position of a state variable, which provides the basis for controlling the behaviors of the robot 1, in a time-series manner on the basis of the position of the reference point recognized by the state recognizing element 111, a plurality of first models, and a second model. The behavior estimating system 110 assesses the stability of each of a plurality of the first models in the process of generating a plurality of estimated trajectories by the trajectory generating element 112, and estimates the behavior manner corresponding to a first model having a highest stability as the behavior manner of the instructor. An estimation result given by the behavior estimating system 110 is output to the behavior control system 120.

The elements constituting the present invention are physically constructed of memories, in which programs for executing arithmetic processing for which they are responsible are saved or stored, and an arithmetic processor (CPU) which reads the programs from the memories and carries out the arithmetic processing for which they are responsible. The programs may be installed in computers through the intermediary of software recording media, such as CDs and DVDs, or may be downloaded into the computers by servers via networks or artificial satellites in response to request signals transmitted from the robot 1 to the servers.

When a constituent device in the present invention "recognizes" information, it means that the constituent device carries out every information processing required for the preparation to subject the information to further arithmetic processing. Such information processing includes, for example, searching information from a database, reading information from a storage, such as a memory, measuring, calculating, estimating or judging information on the basis of basic information retrieved, received, read or the like or on the basis of output signals of sensors or the like, and storing information which has been measured or the like. Some constituent elements (e.g., the state recognizing element 111 and the trajectory generating element 112) of the behavior estimating system 110 may be constructed of an external computer of the robot 1.

The functions of the behavior estimating system 110 having the aforesaid construction will be described.

Figure 4:
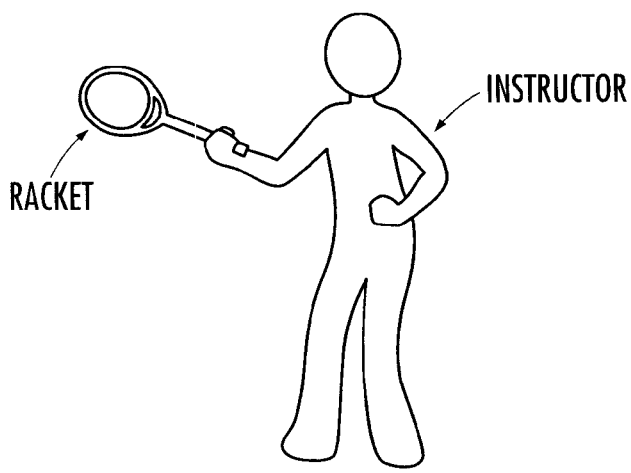
FIG. 4(a) to FIG. 4(c) are graphical illustrations of motions of an instructor in a first embodiment.
Figure 4:
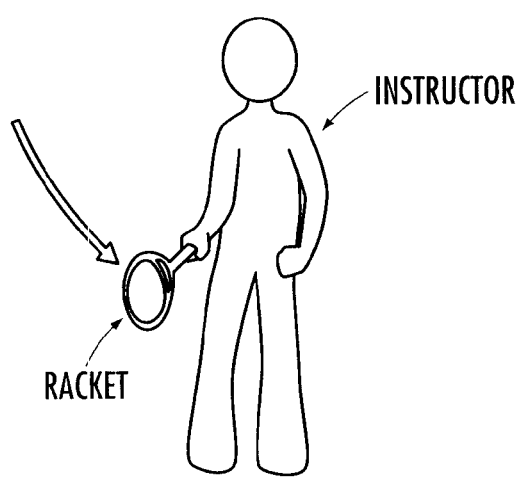
Figure 4:
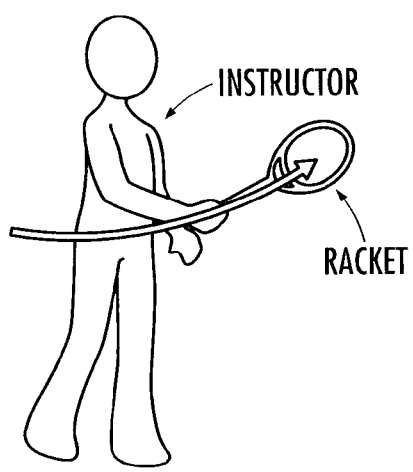

First, the behavior estimating system 110 as a first embodiment of the present invention will be described. The behavior estimating system 110 according to the first embodiment estimates the behavior manner actually taken by a human being, who acts as an instructor, among a plurality of behavior manners of the instructor swinging a racket held in his/her one hand in various manners, as illustrated in FIG. 4($a$) to FIG. 4($c$) in sequence. FIGS. 4($a$), 4($b$), and 4($c$) illustrate a state immediately before the instructor begins to move the racket, a state in which the instructor is moving the racket, and a state in which the instructor has stopped moving the racket, respectively.

Figure 3:
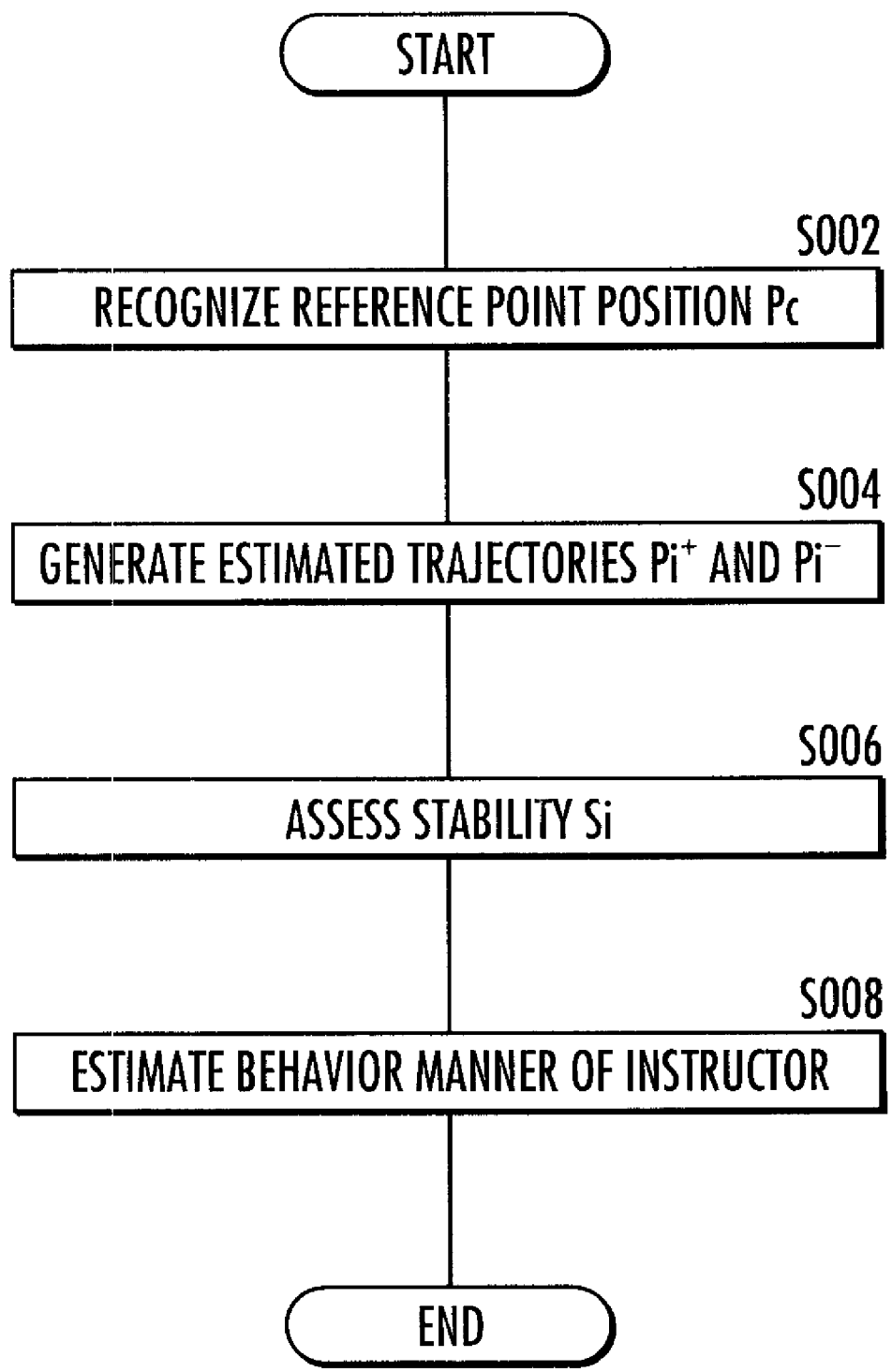
FIG. 3 is a flowchart illustrating a behavior estimating method.

First, the state recognizing element 111 recognizes the position at the reference time point of a state variable, which is displaced as the instructor moves, as a position $P_c$ of a reference point (S002 in FIG. 3). More specifically, a position p(0) of a state variable at a time point immediately before the instructor starts swinging the racket (a time point immediately before velocity and acceleration change from zero) t=0, as illustrated in FIG. 4($a$) is recognized as the position $P_c$ of the reference point. Further, a position p(N) of a state variable at a time point immediately after the instructor finishes swinging the racket (a time point when velocity and acceleration change to zero) t=N, as illustrated in FIG. 4($c$) is measured as the position $P_c$ of the reference point.

For example, the position of the racket (the position of the top thereof) is measured as a state variable. Instead of or in addition to the position of the racket, the position of a specified location, such as a hand, an elbow, a shoulder or a knee, of the instructor (including the racket or the like attached to the instructor) may be measured as a state variable, or the displacing velocity or the acceleration or the like of a characteristic part may be measured as a state variable. Further alternatively, the angle, the angular velocity or the angular acceleration of a specified joint of the instructor, such as a shoulder joint, an elbow joint, a carpal joint and a knee joint, may be measured as a state variable. Further alternatively, an arbitrary combination of the position, the displacing velocity and the acceleration of a specified location and the angle, the angular velocity and the angular acceleration of a specified joint may be recognized as a state variable.

The position of a state variable is measured by an optical motion capture system used as the state sensor 102. The optical motion capture system measures the position of the state variable on the basis of the results of detection of a mark attached to a specified location of the racket or the like, the detection results being provided by one or a plurality of cameras, i.e., trackers, disposed around the instructor.

Alternatively, the position of a state variable may be measured by a mechanical, magnetic or inertial motion capture system. A mechanical motion capture system measures the position of a state variable on the basis of output signals indicative of the angles of joints of the instructor received from supporters attached to the instructor or a plurality of potentiometers attached to a suit. A magnetic motion capture system measures the position of a state variable on the basis of output signals from the supporters attached to the instructor or a plurality of magnetic sensors attached to the suit. An inertial motion capture system measures the position of a state variable on the basis of output signals indicative of the inertial moments of arms or the like received from the supporters attached to the instructor or a plurality of inertial moment sensors attached to the suit.

Subsequently, the trajectory generating element 112 generates a plurality of estimated trajectories $P_i^+$ and $P_i^-$ (i=1, 2, ..., Y) on the basis of the position p of the reference point recognized by the state recognizing element 111 and a plurality of the first models and the second model (S004 in FIG. 3). Here, "+" means a pseudo inverse matrix.

The first models correspond to individual i-th behavior manners of the instructor and represent the shape characteristics of individual reference trajectories indicative of time-series changing manners of the position p of a state variable. More specifically, the first models are defined according to relational expressions (11) and (12) by i-th attractor matrixes $R_i$ and attracting points $u_i$ of i-th attractors.

$$v(k)=R_i p(k)-R_i u(k)+N_i(\mu_v, \Sigma_v) \quad (11)$$

$$u(k+1)=u(k)+\epsilon_i(k)+N_i(\mu_u, \Sigma_u) \quad (12)$$

Relational expression (11) indicates that the level of a displacing velocity $v(k)$ of the position of a second state variable at a time point k is determined on the basis of the attractor matrix $R_i$ and the magnitude of the error of a position $p(k)$ of the second state variable based on an attracting point $u(k)$ at the time point k of the attractor, and that the displacing velocity $v(k)$ of the position of the second state variable is a continuous random variable having a fluctuation or an uncertainty denoted by a probability distribution (generally a Gaussian distribution) $N_i(\mu_v, \Sigma_v)$ ($\mu_v=0$, $\Sigma_v$: covariance matrix). In other words, the level of the displacing velocity $v(k)$ and the degree of the fluctuation of the second state variable at the time point k are determined according to the first models.

Relational expression (12) indicates that the attracting point $u(k)$ of the attractor is allowed to be displaced by a displacement amount $\epsilon_i(k)$ and that the attracting point $u(k)$ is a continuous random variable having an uncertainty denoted by a probability distribution $N_i(\mu_u, \Sigma_u)$ ($\mu_u=0$, $\Sigma_u$: covariance matrix). The second term of the right side of relational expression (12) may be omitted.

The second model represents a motion of the instructor in which each of the position $P(k)$, the displacing velocity (the first-order time differential value) $v(k)$, and the acceleration (the second-order time differential value of the position) $\alpha(k)$ of a state variable smoothly or continuously change. More specifically, the second model is defined according to relational expressions (21) to (23).

$$p(k+1)=p(k)+v(k+1)+N(\mu_p, \Sigma_p) \quad (21)$$

$$v(k+1)=v(k)+\alpha(k+1)+N(\mu_v, \Sigma_v) \quad (22)$$

$$\alpha(k+1)=\alpha(k)+\beta(k+1)+N(\mu_\alpha, \Sigma_\alpha) \quad (23)$$

Relational expression (21) represents one aspect of the second model in which the position $p(k)$ of a state variable smoothly changes and also the position $p(k)$ is a continuous random variable having an uncertainty denoted by a probability distribution $N(\mu_p, \Sigma_p)$ ($\mu_p=0$, $\Sigma_p$: covariance matrix).

Further, relational expression (22) represents another aspect of the second model in which the displacing velocity of the position (the first-order time differential value of the position) $v(k)$ of the state variable smoothly changes and the displacing velocity $v(k)$ is a continuous random variable having an uncertainty denoted by a probability distribution $N(\mu_v, \Sigma_v)$ ($\mu_v=0$, $\Sigma_v$: covariance matrix).

Further, relational expression (23) represents still another aspect of the second model in which the displacing acceleration of the position (the second-order time differential value of the position) $\alpha(k)$ of the state variable smoothly changes and the displacing acceleration $\alpha(k)$ is a continuous random variable having an uncertainty denoted by a probability distribution $N(\mu_\alpha, \Sigma_\alpha)$ ($\mu_\alpha=0$, $\Sigma_\alpha$: covariance matrix). Here, $\beta(k)$ denotes the jerk of the position (the third-order time differential value of the position ($=d^3p/dt^3$)) of the state variable. In relational expression (23), the second term of the right side may be omitted.

Figure 6:
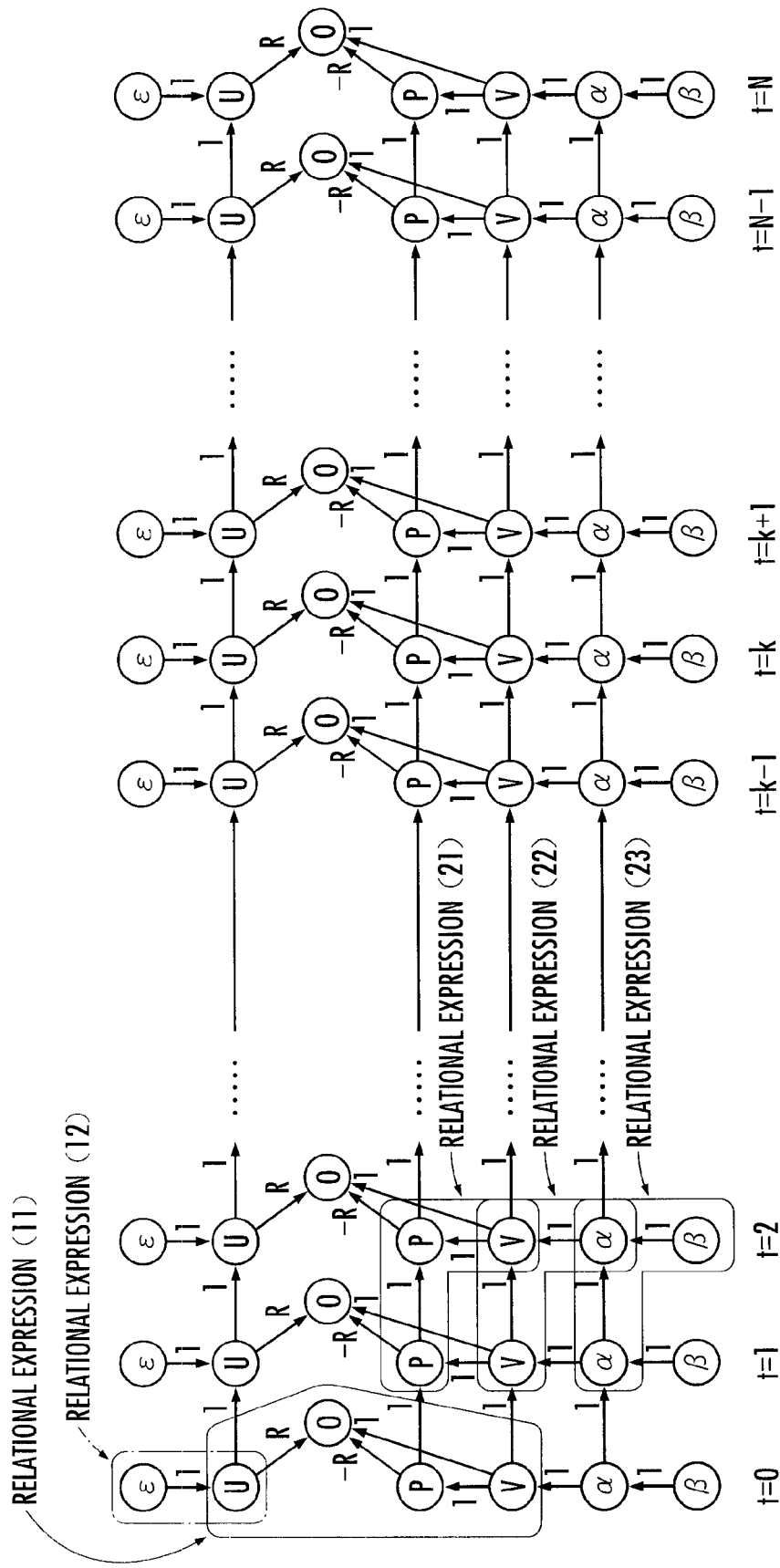
FIG. 6 is a graphical illustration of a stochastic transition model (DBN) in the first embodiment.

The first models and the second model define stochastic transition models expressed by dynamic Bayesian networks (DBN) illustrated in FIG. 6. According to the DBN, relational expressions (11), (12), and (21) to (23) are represented by nodes (circles) denoting the position p of a second state variable and a state variable, such as the attracting point u of an attractor at each time point t, and arrows connecting the nodes on the basis of conditional probabilities. Further, the conditional probabilities corresponding to relational expressions (11), (12), and (21) to (23), respectively, are represented by relational expressions (111), (112), and (121) to (123), respectively.

$$P(0|v(k),p(k),u(k))=N(v(k)-Rp(k)+Ru(k),0)=N(0,0) \quad (111)$$

$$P(u(k+1)|u(k),\epsilon(k))=N(u(k)+\epsilon(k),\Sigma_u) \quad (112)$$

$$P(p(k+1)|p(k),v(k+1))=N(p(k)+v(k+1),\Sigma_p) \quad (121)$$

$$P(v(k+1)|v(k),\alpha(k))=N(v(k)+\alpha(k+1),\Sigma_v) \quad (122)$$

$$P(\alpha(k+1)|\alpha(k),\beta(k))=N(\alpha(k)+\beta(k+1),\Sigma_\alpha) \quad (123)$$

The state variable node $\epsilon$ in relational expression (112) is represented by relational expression (212). The state variable node $\beta$ in relational expression (123) is represented by relational expression (223).

$$P(\epsilon(k))=N(0,\Sigma_\epsilon) \quad (212)$$

$$P(\beta(k))=N(0,\Sigma_\beta) \quad (223)$$

Subsequently, a plurality of i-th estimated trajectories $Q_i$ is generated according to the stochastic transition models. To be specific, in the DBN given in FIG. 6, the position p, the velocity v, the acceleration $\alpha$, and the jerk $\beta$ of the state variable at the reference time points t=0 and t=N, respectively, are set. The measurement position of a specified location, such as the racket position, at the time point t=0 at which the instructor starts to move the racket, as illustrated in FIG. 4(a) is determined as the position p(0) of the first reference time point t=0. The nodes of the velocity v(0), the acceleration $\alpha(0)$, and the jerk $\beta(0)$ at the first reference time point t=0 are all set to zero. The measurement position of a specified location at t=N at which the instructor stops moving the racket as illustrated in FIG. 4(c) is set as the position p(N) at the second reference time point t=N. Further, the velocity v(N), the acceleration $\alpha(N)$, and the jerk $\beta(N)$ at the second reference time point t=N are all set to zero.

Further, the nodes from the first reference time point t=0 to the second reference time point t=N are sequentially estimated in the forward direction (in the direction from a front time point toward a rear time point) in a time-series manner according to the stochastic transition models represented by relational expressions (11), (12), and (21) to (23). Thus, the estimated trajectory in the forward direction $P_i^+$, which indicates the changing manner of the estimated position of the state variable for the forward direction in the time series, is generated.

Similarly, the nodes from the second reference time point t=N to the first reference time point t=0 are sequentially estimated in the reverse direction (in the direction from the rear time point toward the front time point) in a time-series manner according to the stochastic transition models. Thus, the estimated trajectory in the reverse direction $P_i^-$, which indicates the changing manner of the estimated position of the state variable for the reverse direction in a time-series manner, is generated.

Further, a permissible passing range which expands using the estimated trajectory in the forward direction $P_i^+$ as the reference is set, and a permissible passing range which expands using the estimated trajectory in the reverse direction $P_i^-$ as the reference is set. Then, a resultant permissible passing range is set by combining the two permissible passing ranges, and a learning trajectory $P_i$ is generated such that the position p(k) of the state variable at each time point falls within the resultant permissible passing range.

As the method for estimating nodes in the DBN, Loopy Belief Propagation, Variable Elimination, Junction Tree, Importance Sampling, Hugin Algorithm, Shafer-Shenoy Algorithm, Variational Message Passing, Gibbs Sampling or the like may be employed in addition to the method described above, which is called Belief Propagation.

Figure 7:
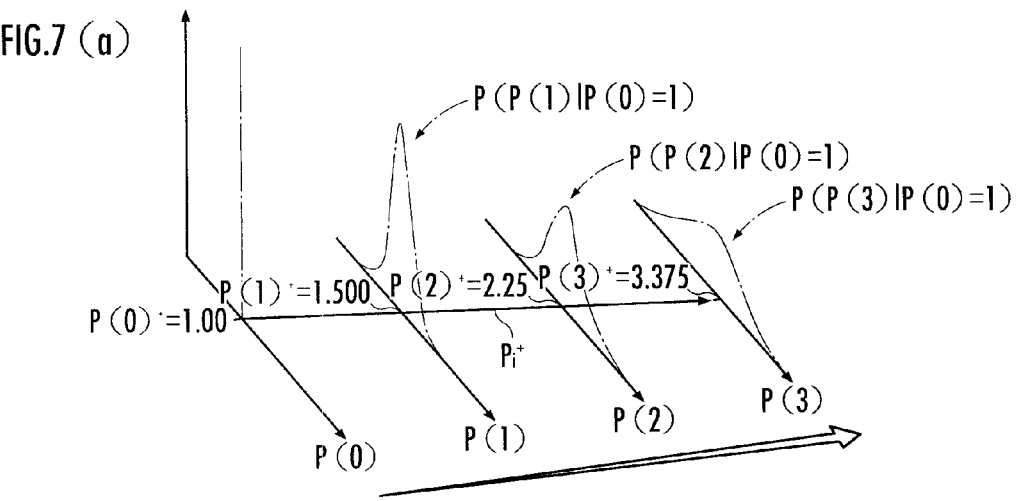
FIG. 7(a) to FIG. 7(c) are graphical illustrations of a method for filling nodes in the stochastic transition model.
Figure 7:
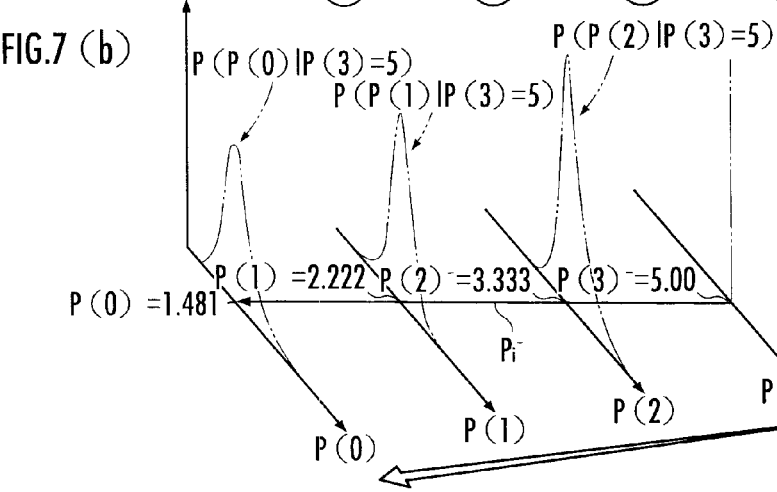
Figure 7:
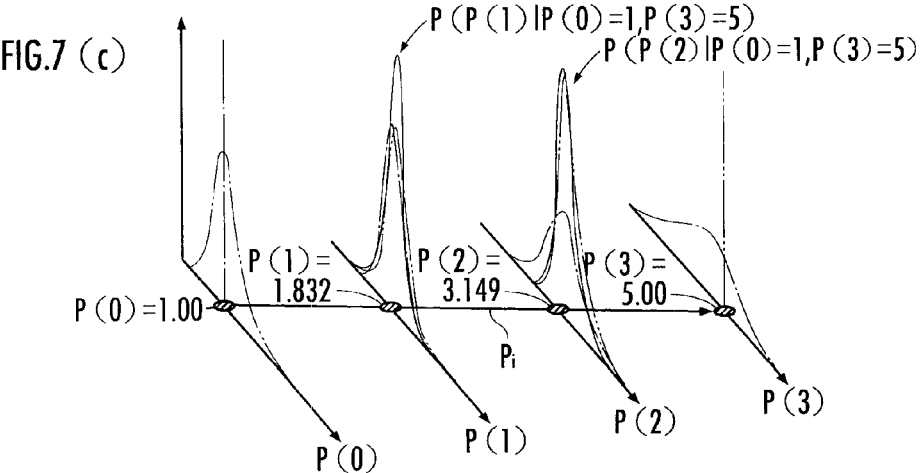

For easier understanding of the method for generating the estimated trajectory $Q_1$, a situation will be considered in which the position p(k) of the state variable is one-dimensional (scalar) and estimated according to a relational expression of p(k+1)=Ap(k) (A=1.50). In this situation, it is assumed that a measurement position p(0) of the state variable at t=0 is 1.00 and a target position p(3) of the state variable at t=3 is 5.00. In this case, a trajectory that goes through $p^+(0)$ (=p(0)), $p^+(1)$ (=Ap(0)), $p^+(2)$ (=$A^2$p(0)), and $p^+(3)$ (=$A^3$p(0)) in order, as illustrated in FIG. 7(a), is generated as the estimated trajectory in the forward direction $P_i^+$. Meanwhile, a trajectory that goes through $p^-(3)$ (=p(3)), $p^-(2)$ (=$A^{-1}$p(0)), $p^-(1)$ (=$A^{-2}$p(0)), and $p^-(0)$ (=$A^{-3}$p(0)) in order, as illustrated in FIG. 7(b) is generated as the estimated trajectory in the reverse direction $P_i^-$.

As illustrated in FIG. 7(a), a conditional probability distribution (indicated by the chain line) P ($p^+(k)$|p(0)=1.00) (k=1, 2,3) of an estimated position $p^+(k)$ of the state variable at each time point in the time-series forward direction is calculated as a permissible passing range at each time point which expands, using the estimated trajectory in the forward direction $P_i^+$ as the reference thereof.

Further, as illustrated in FIG. 7(b), a conditional probability distribution (indicated by the two-dot chain line) P($p^-(k)$|p(3)=5.00) (k=2,1,0) of an estimated position $p^-(k)$ of a second state variable at each time point in the time-series reverse direction is calculated as a permissible passing range at each time point which expands, using the estimated trajectory in the reverse direction $P_i^-$ as the reference thereof.

Then, these two conditional probability distributions are combined to obtain the conditional probability distribution P(p(k)|p(0)=1.00, p(3)=5.00) (k=1,2) as a resultant permissible passing range. Thus, as illustrated in FIG. 7(c), the trajectory that goes through the positions p(0)=1.00, p(1)=1.842, p(2)=3.149, and p(3)=5.00, each of which indicates a maximum conditional probability at each time point k, in order is derivatively generated as a learning trajectory $P_i$. The learning trajectory $P_i$ provides the basis for the behavior control of the robot 1 acting as the agent, as will be described later.

Figure 8:
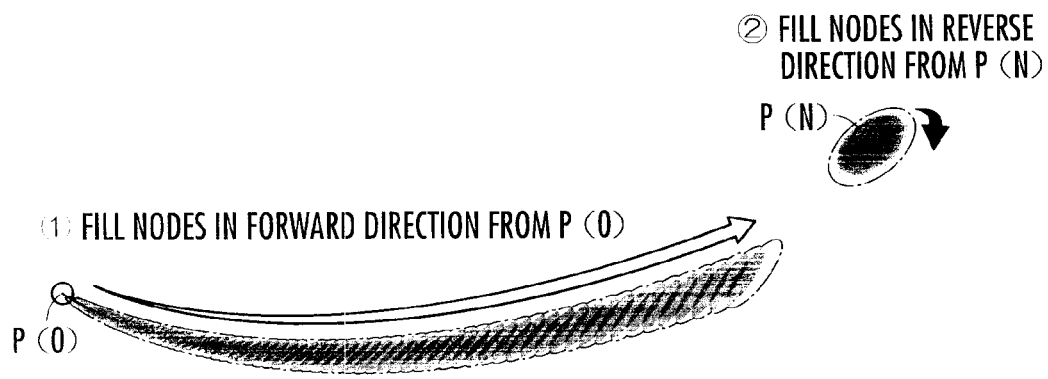
FIG. 8(a) and FIG. 8(b) are graphical illustrations of a method for generating estimated trajectories in the first embodiment.
Figure 8:
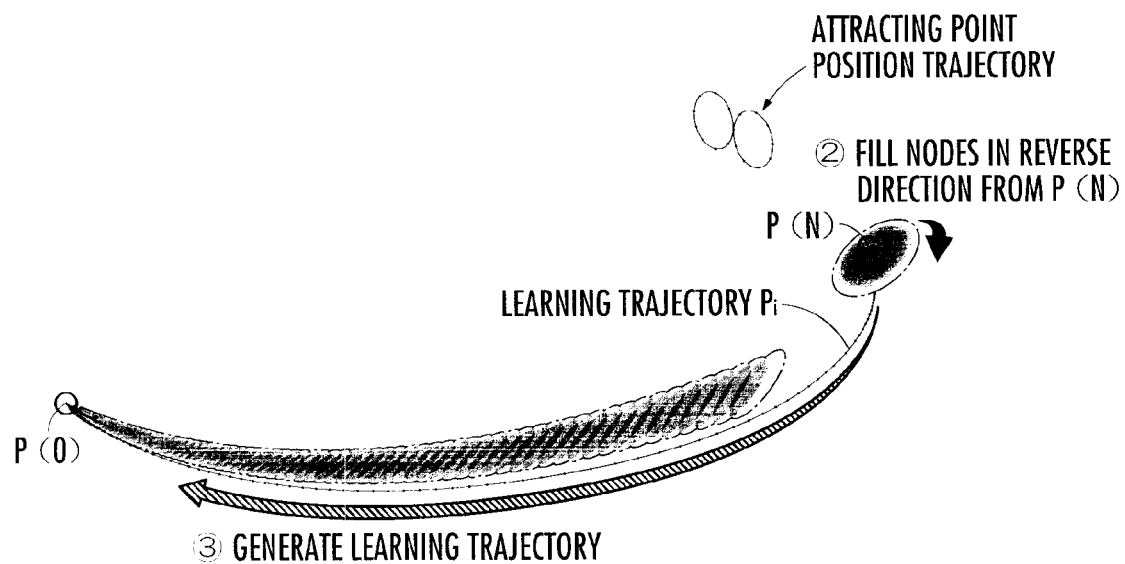

To be specific, as illustrated in FIG. 8(a), the estimated positions $p^+(0)$ (=p(0)), $p^+(1)$, $p^+(2)$, ..., $p^+(N)$ of the second state variable are sequentially estimated in the forward direction in a time series manner (refer to the white arrow) from the first reference time point t=0 to the second reference time point t=N. Thus, the trajectory that goes through the estimated positions $p^+(0)$, $p^+(1)$, $p^+(2)$, ..., $p^+(N)$ of the second state variable in order is generated as the estimated trajectory in the forward direction.

Further, as illustrated in FIG. 8(a), the estimated positions $p^-(N)$ (=p(N)), $p^-(N-1)$, $p^-(N-2)$, ..., $p^-(0)$ of the second state variable are estimated in the reverse direction in a time series manner (refer to the black arrow) from the second reference time point t=N to the first reference time point t=0. Thus, the trajectory that goes through the estimated positions $p^-(N)$, $p^-(N-1)$, $p^-(N-2)$, ..., $p^-(0)$ of the second state variable in order is generated as the estimated trajectory in the reverse direction.

Further, as illustrated in FIG. 8(b), the probability distribution around the points $p^+(0)$, $p^+(1)$, $p^+(2)$, ..., $p^+(N)$ of the estimated trajectory in the forward direction (refer to the third term of the right side of relational expression (21)) and the probability distribution around the points $p^-(N)$, $p^-(N-1)$, $p^-(N-2)$, ..., $p^-(0)$ of the estimated trajectory in the reverse direction are superimposed or combined to set a resultant permissible passing range. Then, as indicated by the hatched arrow, the learning trajectory $P_i$ is generated such that the position of the state variable falls within the resultant permissible passing range at each time point.

As indicated by the chain line in FIG. 8(a), a permissible passing range (probability distribution range) expands around the individual points of the estimated trajectory in the forward direction $P_i^+$ (refer to FIG. 7(a)). As indicated by the two-dot chain line in FIG. 8(a), a permissible passing range (probability distribution range) expands around the individual points of the estimated trajectory in the reverse direction $P_i^-$ (refer to FIG. 7(b)). The expansion of the superimposition of these probability distributions corresponds to the permissible passing range of the learning trajectory $P_i$ (refer to FIG. 7(c)).

The permissible passing range in the forward direction and the permissible passing range in the reverse direction need not be always combined at every time point. Instead, for example, the learning trajectory $P_i$ may be generated by generating a first partial trajectory that passes the permissible passing range in the forward direction for a first period t=0 to k and a second partial trajectory that passes the permissible passing range in the reverse direction for a second period t=k+1 to N following the first period, and then by smoothly connecting the first partial trajectory and the second partial trajectory.

Further alternatively, the learning trajectory $P_i$ may be generated by generating a first partial trajectory which passes the permissible passing range in the forward direction for the first period t=0 to k, a second partial trajectory which passes the permissible passing range in the reverse direction for a second period t=k+c (c>1) to N, which comes after the first period, and an intermediate partial trajectory for a period t=k+1 to k+c−1 for smoothly connecting the first partial trajectory and the second partial trajectory, and then connecting the first partial trajectory, the intermediate partial trajectory, and the second partial trajectory in order.

Further, in the process of generating a plurality of combinations of the estimated trajectories in the forward direction $P_i^+$ and the estimated trajectories in the reverse direction $P_i^-$ by the trajectory generating element 112, the behavior estimating system 110 assesses the stability of each of a plurality of first models (S006 in FIG. 3). More specifically, the attracting points are gradually displaced as illustrated in FIG. 8(b) in the process of generating the estimated trajectories in the forward direction $P_i^+$ and the estimated trajectories in the reverse direction $P_i^-$ (refer to relational expression (12)). A stability $s_i$ of the first models is assessed to be higher as the cumulative displacement amount or the cumulative fluctuation amount thereof is less.

The behavior manner corresponding to a first model having the highest stability $s_i$ is estimated as the behavior manner of the instructor (S008 in FIG. 3). For example, the behavior manners discriminated by the levels of displacing velocity and acceleration of a state variable position, such as swinging a racket slowly or swinging the racket fast, or the behavior manners discriminated by the magnitude of the displacement amount of a state variable position, such as making a large swing of a racket or making a small swing of the racket, or the behavior manners discriminated by the trajectory shape of a state variable position, such as swinging a racket in an arc as observed from above an instructor, swinging the racket in an S-shape as observed from above the instructor, or swinging the racket in a straight line as observed from above the instructor, are estimated as the behavior manners of an instructor.

The learning trajectory $P_i$ generated by the trajectory generating element 112 on the basis of the first model having the highest stability $s_i$ is output to the behavior control system 120. Then, the behavior control system 120 controls the motions of the robot 1 such that the position p(k) of the state variable is displaced according to the learning trajectory $P_i$ (S010 in FIG. 3).

Figure 5:
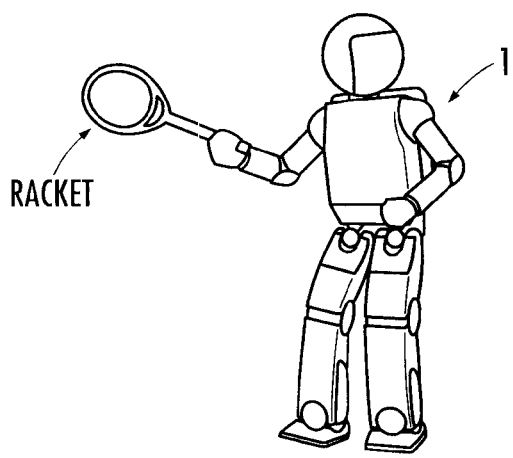
FIG. 5(a) to FIG. 5(c) are graphical illustrations of motions of a robot in the first embodiment.
Figure 5:
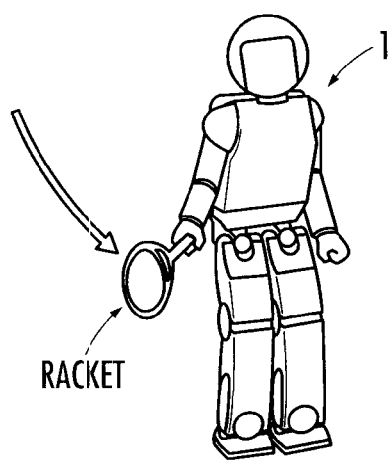
Figure 5:
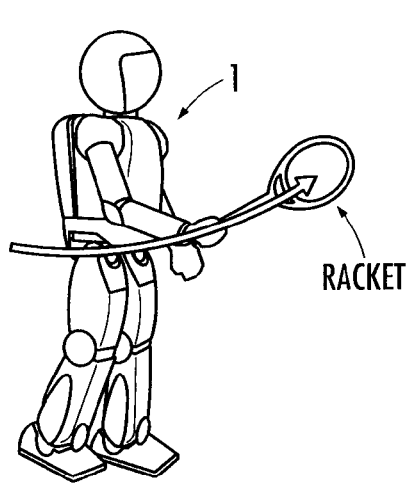

More specifically, the operations of the actuators 1000 are controlled such that the racket position as the state variable is displaced in the manner based on the learning trajectory $P_i$. This causes the robot 1 to swing the racket held in one hand 13 thereof, as illustrated in FIGS. 5(a) to 5(c) in order. The scale of the learning trajectory $P_i$ may be adjusted on the basis of the ratio of the motion scale of the robot 1 relative to the motion scale of the instructor. For instance, the ratio of the length of the arm 12 of the robot 1 relative to the length of an arm of the instructor may be multiplied by the attractor matrix $R_i$ thereby to adjust the scale of the learning trajectory $P_i$. Further, the ratio of the sum of the length of the arm 12 of the robot 1 and the length of the racket used by the robot 1 relative to the sum of the length of the arm of the instructor and the length of the racket used by the instructor may be multiplied by the attractor matrix $R_i$ thereby to adjust the scale of the learning trajectory $P_i$.

Figure 9:
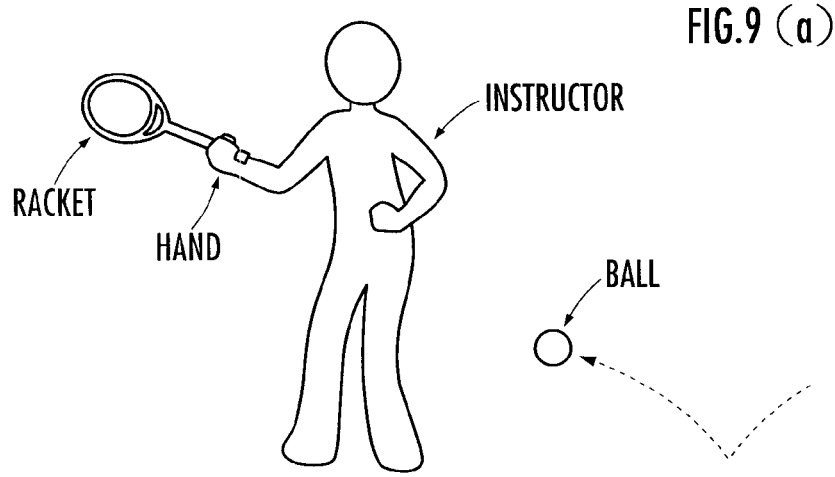
FIG. 9(a) to FIG. 9(c) are graphical illustrations of motions of an instructor in a second embodiment.
Figure 9:
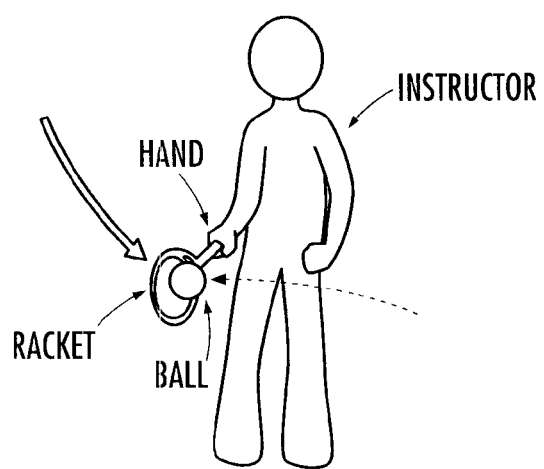
Figure 9:
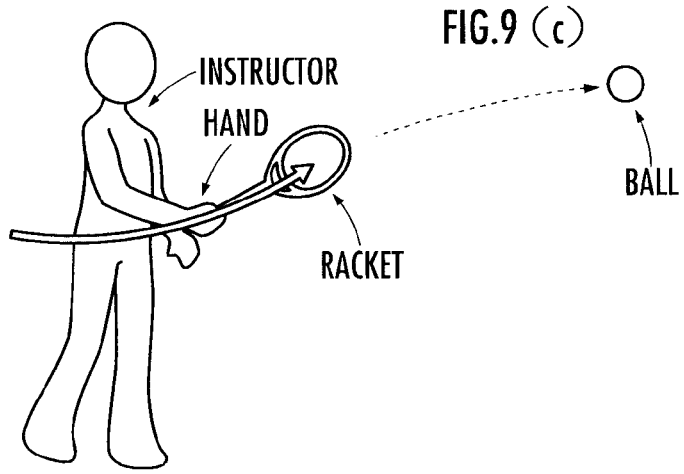

A behavior estimating system 110 as a second embodiment of the present invention will now be described. The behavior estimating system 110 according to the second embodiment estimates a behavior manner taken by a human being, who acts as an instructor, among a plurality of behavior manners of hitting back a ball coming toward him/her at different timings by using a racket held in his/her one hand, as illustrated in FIGS. 9(a) to 9(c) in order. FIGS. 9(a), 9(b), and 9(c) illustrate a state immediately before the instructor starts moving the racket, a state in which the ball has touched the racket, and a state in which the instructor has stopped moving the racket, respectively.

The behavior manners described above may differ before and after the instructor hits the ball against the racket (the instant of an impact), i.e., the instructor applies a force to the ball (object). For this reason, the second embodiment adopts a plurality of first models indicative of behavior manners of the instructor which switch, at various time points, from a first behavior manner for the instructor to strike the ball against the racket to a second behavior manner after the instructor strikes the ball against the racket.

Figure 11:
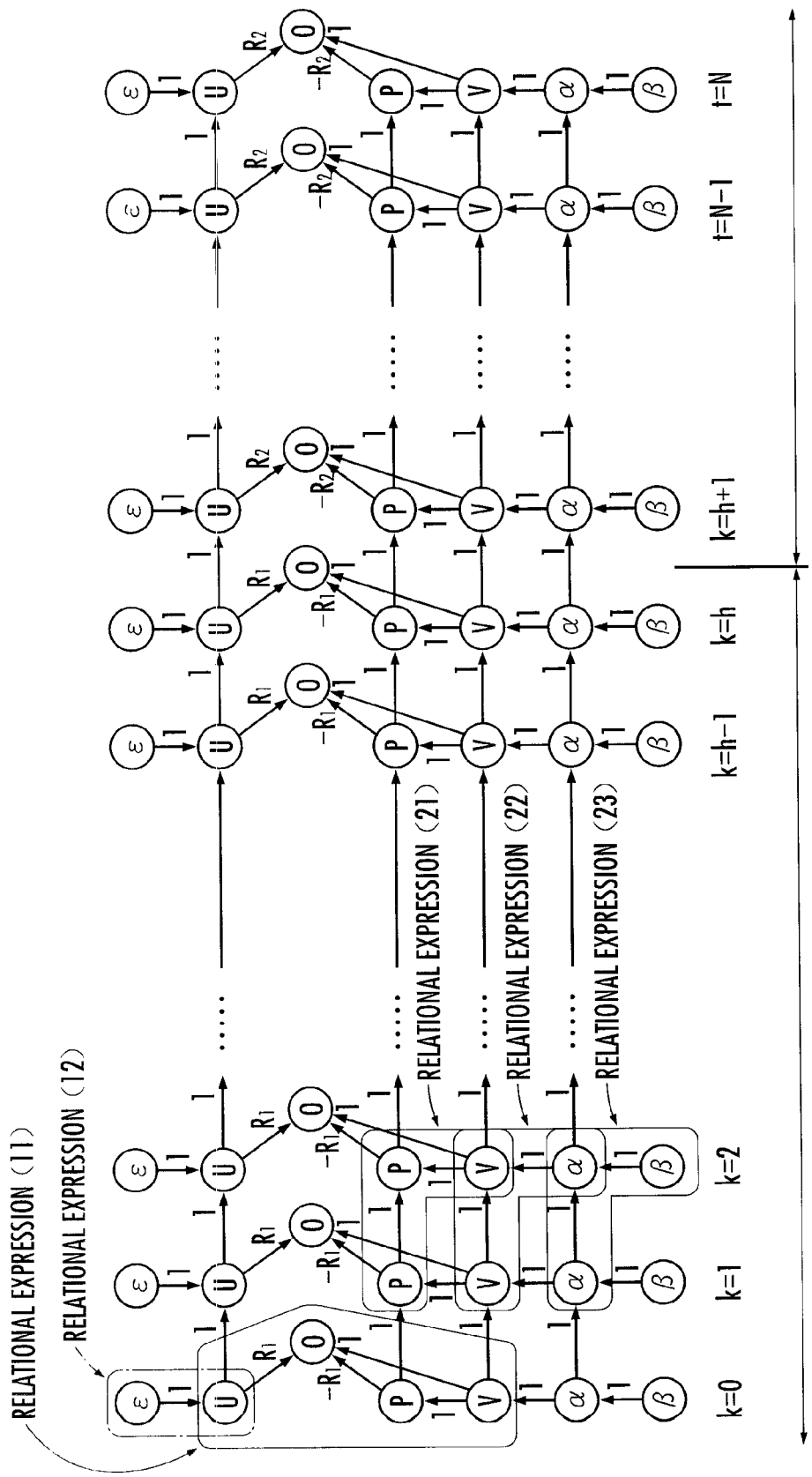
FIG. 11 is a graphical illustration of a stochastic transition model (DBN) in the second embodiment.

A first model is adopted, in which the shape characteristic of a reference trajectory is expressed by a first attractor matrix $R_1$ and a first attracting point $u_1(k)$ corresponding to the first behavior manner in a first period [t|0 to h (<N)] from a first reference time point t=0 to an intermediate reference time point t=h, and the shape characteristic of the reference trajectory is expressed by a second attractor matrix $R_2$ and a second attracting point $u_2(k)$ corresponding to the second behavior manner in a second period [t|h+1 to N] up to a second reference time point t=N following the first period. A plurality of reference trajectories is distinguished by difference in time point k=h of the transition from the first behavior manner to the second behavior manner. Thus, stochastic transition models are defined, in which the attractor matrixes shift from the first attractor matrixes $R_1$ to the second attractor matrixes $R_2$ at different time points k=h, as illustrated in FIG. 11.

Figure 12:
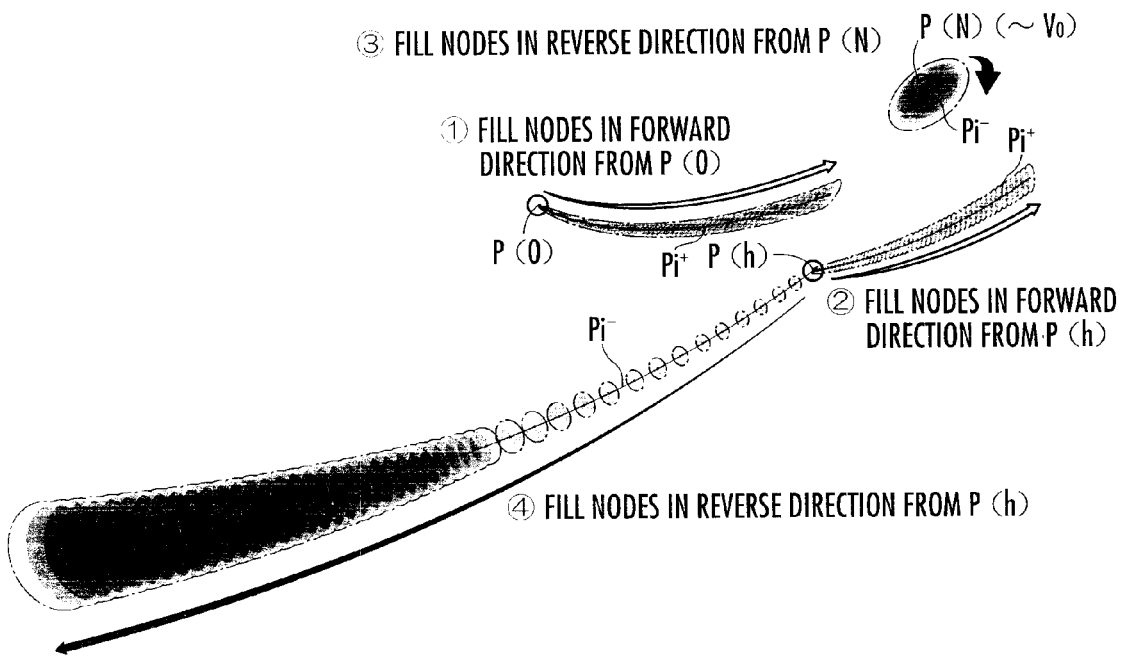
FIG. 12(a) and FIG. 12(b) are graphical illustrations of a method for generating estimated trajectories.
Figure 12:
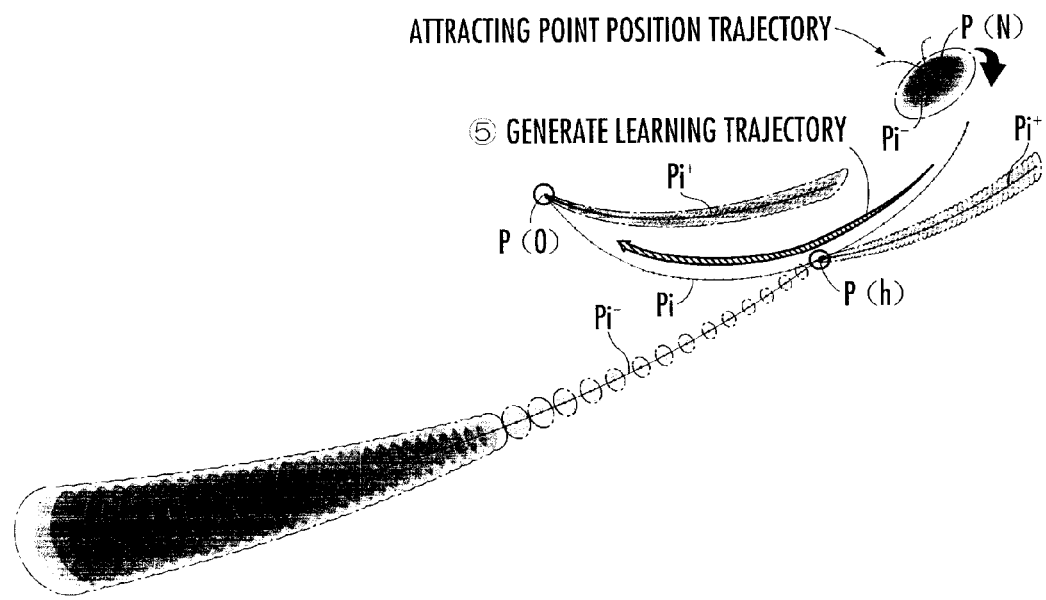

Then, as illustrated in FIG. 12(a), positions $p^+(0)$ (=p(0)), $p^+(1), p^+(2), \ldots, p^+(h-1)$ of the second state variable are sequentially estimated in the forward direction in a time series manner (refer to the white arrow) from the first reference time point t=0 to a time point t=h−1 immediately before the intermediate reference time point t=h.

Similarly, as illustrated in FIG. 12(a), positions $p^+(h)$ (=p(h)), $p^+(h+1), p^+(h+2), \ldots, p^+(N)$ of the second state variable are sequentially estimated in the forward direction in a time series manner (refer to the white arrow) from the intermediate reference time point t=h to the second reference time point t=N. Thus, the trajectory that goes through the estimated positions $p^+(0), p^+(1), \ldots, p^+(h-1), p^+(h), p^+(h+1), \ldots, p^+(N)$ of the second state variable in order is generated as the estimated trajectory in the forward direction.

Meanwhile, as illustrated in FIG. 12(a), positions $P^-(N)$ (=p(N)), $p^-(N-1), p^-(N-2), \ldots, p^-(h+1)$ of the second state variable are sequentially estimated in the reverse direction in a time series manner (refer to the black arrow) from the second reference time point t=N to a time point t=h+1 immediately after the intermediate reference time point t=h.

Similarly, as illustrated in FIG. 12(a), positions $p^-(h)$ (=p(h)), $p^-(h-1), p^-(h-2), \ldots, p^-(0)$ of the second state variable are sequentially estimated in the reverse direction in a time series manner (refer to the black arrow) from the intermediate reference time point t=h to the first reference time point t=0. Thus, the trajectory that goes through the estimated positions $p^-(N), p^-(N-1), \ldots, p^-(h+1), p^-(h), p^-(h-1), \ldots, p^-(0)$ of the second state variable in order is generated as the estimated trajectory in the reverse direction.

Then, as illustrated in FIG. 12(b), the probability distribution around the points $p^+(0), \ldots, p^+(h-1), p^+(h), p^+(h+1), \ldots, p^+(N)$ of the estimated trajectory in the forward direction and the probability distribution around the points $p^-(N), \ldots, p^-(h+1), p^-(h), p^-(h-1), \ldots, p^-(0)$ of the estimated trajectory in the reverse direction are superimposed or combined to set a resultant permissible passing range. Then, as indicated by the hatched arrow, the learning trajectory $P_i$ is generated such that the position of the second state variable falls within the resultant permissible passing range at each time point.

As indicated by the chain line in FIG. 12(a), a permissible passing range (probability distribution range) expands around the individual points of the estimated trajectory in the forward direction (refer to FIG. 7(a)). As indicated by the two-dot chain line in FIG. 12(a), a permissible passing range (probability distribution range) expands around the individual points of the estimated trajectory in the reverse direction (refer to FIG. 7(b)). The expansion of the superimposition of these probability distributions corresponds to the permissible passing range of the learning trajectory $P_i$ (refer to FIG. 7(c)).

Further, in the process of generating a plurality of estimated trajectories $Q_1$ by the trajectory generating element 112, the behavior estimating system 110 assesses the stability of each of a plurality of first models (S006 in FIG. 3). More specifically, a stability si of a first model is assessed to be higher as the cumulative displacement amount of the attracting point $u_i(k)$ of an i-th attractor in the process of generating the estimated trajectory $Q_i$ is smaller.

The behavior manner corresponding to a first model having the highest stability $s_i$ is estimated as the behavior manner of the instructor (S008 in FIG. 3).

For example, the behavior manners discriminated by the level of displacing velocity and acceleration of a state variable position, such as swinging a racket so that the racket is slowly accelerated before hitting a ball and then swinging the racket so that the racket is slowly decelerated after hitting the ball, or swinging the racket so that the racket is rapidly accelerated and the speed is maintained before hitting the ball and then the racket is rapidly decelerated after hitting ball are estimated as the behavior manners of the instructor. Further, the behavior manners discriminated by the magnitude of the displacement amount of a state variable position, such as making a small swing of a racket partway and then making a large swing thereafter or making a large swing of the racket partway and then making a small swing thereafter, or the behavior manners discriminated by the trajectory shape of a state variable position, such as swinging the racket in a straight line partway and then in an arc as observed from above the instructor, or swinging the racket in an arc partway and then in a straight line as observed from above the instructor, are estimated as the behavior manners of the instructor.

The estimated trajectory $Q_i$ generated by the trajectory generating element 112 on the basis of the first model having the highest stability $s_i$ is output to the behavior control system 120. Then, the behavior control system 120 controls the motions of the robot 1 such that the position of the state variable is displaced according to the estimated trajectory $Q_i$ serving as a learning trajectory (S010 in FIG. 3).

More specifically, the position and the speed of the ball coming toward the robot 1 are measured on the basis of detection results of the ball provided by a motion capture system or an image sensor mounted in the robot 1, and the position p(h) of the state variable at the intermediate reference time point t=h at which the ball is hit against the racket is predicted on the basis of the measurement results. Further, the position and the posture of the robot 1 are adjusted as necessary such that the position p(h) of the state variable at a time point when the behavior manner changes in the learning trajectory $P_i$ agrees with the predicted state variable position.

Figure 10:
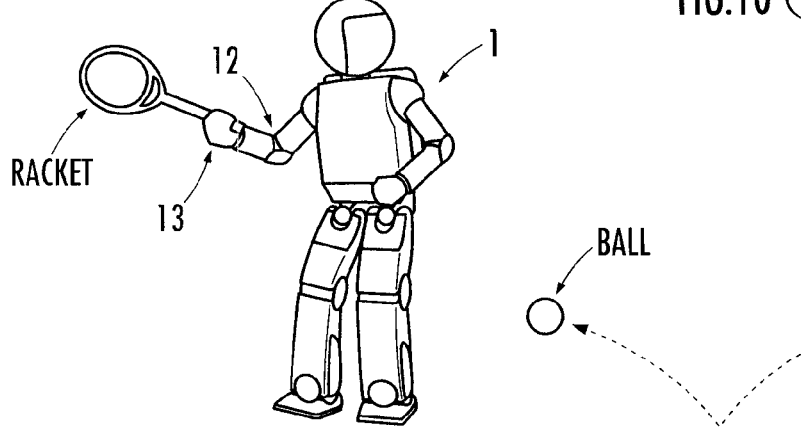
FIG. 10(a) to FIG. 10(c) are graphical illustrations of motions of a robot in the second embodiment.
Figure 10:
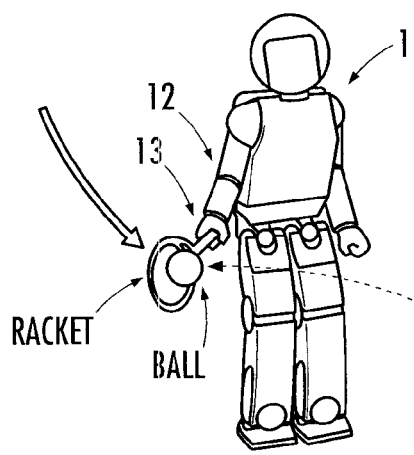
Figure 10:
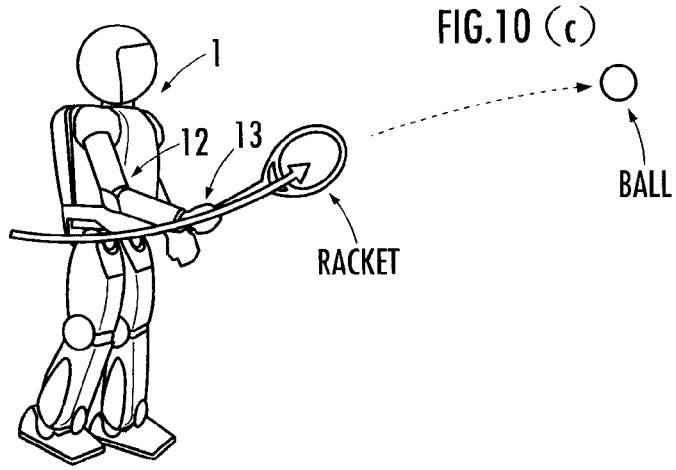

Then, the operations of the actuators 1000 are controlled such that the position of the racket as the state variable is displaced in the manner based on the learning trajectory $P_i$. This causes the robot 1 to hit back the ball coming toward the robot 1 on the forehand by using the racket held in one hand, as illustrated in FIG. 10(a) to FIG. 10(c) in order.

According to the behavior estimating system 110 in accordance with the first and the second embodiments which exhibit the functions described above, the estimated trajectories $P_i^+$ and $P_i^-$ indicating the time-series changing manners of the estimated position of a state variable are generated on the basis of the positions $p_c$ of reference points according to the first models and the second model thereof (refer to S004 in FIG. 3, the white arrow and the black arrow in FIG. 8(a), and the white arrow and the black arrow in FIG. 12(a)).

The first model represents the shape characteristic of each reference trajectory indicating the time-series changing manner of the position of a state variable which corresponds to each of different behavior manners of the instructor (refer to relational expressions (11) and (12) and FIG. 6).

The second model represents the motion of the instructor in which the position of the state variable and one or a plurality of n-th order time differential values (n=1, 2, ...) thereof (the first-order time differential value (velocity v(k)) and the second-order time differential value (acceleration α(k)) in the aforesaid embodiments) continuously change (refer to relational expressions (21) to (23) and FIG. 6).

Thus, the estimated trajectories $P_i^+$ and $P_i^-$ represent the time-series changing manner of the position p(k) of the state variable in the case where it is assumed that the instructor has taken a certain behavior manner in a smooth motion wherein the position p(k), the velocity v(k), and the acceleration α(k) of a state variable are continuous.

Fluctuations of the first models are allowed under a condition that estimated trajectories $P_i^+$ and $P_i^-$ are generated such that the estimated trajectories pass reference points $P_c$ or ranges in the vicinity thereof (refer to relational expression (12)). A first model having a small cumulative fluctuation amount, i.e., a high stability $s_i$, is very likely to be a model which permits least difficult or smoothest reproduction of the time-series changing manner of the position of a state variable when the instructor moves. Therefore, the behavior manner corresponding to the first model with the high stability $s_i$ is very likely to correspond to an actual behavior manner of the instructor. Thus, the estimation accuracy is improved by estimating the behavior manner corresponding to the first model having the highest stability $s_i$ as the behavior manner of the instructor.

Moreover, according to the behavior estimating system in accordance with the second embodiment, a plurality of estimated trajectories is generated on the basis of a plurality of first models corresponding to a variety of behavior manners which all change along the way but differ in the change timing k=h (refer to FIG. 11 and FIGS. 12(a) and 12(b)).

Further, the behavior manner corresponding to the first model having a highest stability $s_i$ identified while generating a plurality of the estimated trajectories is estimated as the behavior manner of the instructor, as described above. This leads to improved accuracy of estimating behavior manners distinguished by the difference in timing at which a first behavior manner is switched to a second behavior manner, more specifically, the difference in timing at which an instructor applies a force to an object.

In addition to the behavior manner of swinging a racket or hitting a ball back by a racket, various other behavior manners of an instructor, such as dancing which involves the movement of arms and legs or carrying an object, may be estimated. Further, other behavior manners of an instructor, in which a behavior manner differs before a force is applied to an object and after the force is applied to the object may be estimated. Such behavior manners include, for example, a behavior manner of the instructor hitting a ball (an object) against a racket, or a task in which an instructor repeatedly moves his/her hand or hands into contact with and then moves his/her hand or hands off an object, such as a pillar, or a behavior manner of an instructor walking, running or tap-dancing on a floor (object) by repeatedly moving his/her leg or legs into contact with and then moving his/her leg or legs off the floor (object) may be estimated.

What is claimed is:

1. A behavior estimating system for estimating a behavior manner of an instructor, comprising:
   a state recognizing element which recognizes a position of a state variable, which is displaced as the instructor moves, at one or a plurality of reference time points as the position of one or a plurality of reference points; and
   a trajectory generating element which generates, on the basis of the position or positions of the reference point or points recognized by the state recognizing element, a plurality of estimated trajectories representing estimated positions of the state variable in a time-series manner according to a plurality of first models which correspond to a plurality of behavior manners of the instructor and represent shape characteristics of individual reference trajectories indicative of the time-series changing manners of the position of the state variable and a second model which represents a motion of the instructor in which the position of the state variable and one or a plurality of n-th order time differential values (n=1, 2, . . .) thereof continuously change, under a condition that the estimated trajectories pass the reference point or points or a range or ranges in the vicinity thereof, wherein fluctuations of the first models are allowed, stabilities of the first models in the process of generation of the plurality of estimated trajectories by the trajectory generating element are assessed on the basis of cumulative amounts of the fluctuations, and a behavior manner corresponding to one of the first models which exhibits a highest stability is estimated as a behavior manner of the instructor.

2. The behavior estimating system according to claim 1, wherein the trajectory generating element generates an estimated trajectory in a forward direction as the estimated trajectory by estimating the position of the state variable at each time point in the forward direction in a time-series manner, and generates an estimated trajectory in a reverse direction as the estimated trajectory by estimating the position of the state variable at each time point in the reverse direction.

3. The behavior estimating system according to claim 1, wherein the trajectory generating element generates a plurality of the estimated trajectories on the basis of a plurality of the first models respectively corresponding to a plurality of behavior manners respectively of the instructor which change from a first behavior manner to a second behavior manner at different time points.

4. The behavior estimating system according to claim 3, wherein the trajectory generating element generates a plurality of the estimated trajectories on the basis of a plurality of the first models respectively corresponding to a plurality of behavior manners respectively of the instructor which change, at different time points, from the first behavior manner for the instructor to apply a force to an object to the second behavior manner after the instructor applies the force to the object.

5. The behavior estimating system according to claim 1, wherein the trajectory generating element defines the shape characteristics of the reference trajectories by attractors and the positions of attracting points thereof and generates the estimated trajectories by using the first models which fluctuate by displacements of the attracting points, and the behavior estimating system assesses the first models having smaller cumulative displacement amounts of the attracting points of the attractors as the ones having higher stabilities.

* * * * *